(12) United States Patent
Hoffman et al.

(10) Patent No.: US 7,430,847 B2
(45) Date of Patent: Oct. 7, 2008

(54) ELECTRICAL SWITCHES MOUNTED IN STEERING LEVER GRIPS OF ZERO TURNING RADIUS MOWER

(75) Inventors: Brad Allen Hoffman, Angier, NC (US); Ashley Trent Moorehead, Fuquay-Varina, NC (US); Kevin Patrick Lund, Apex, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/673,222

(22) Filed: Feb. 9, 2007

(65) Prior Publication Data

US 2008/0190085 A1   Aug. 14, 2008

(51) Int. Cl.
*A01D 69/00* (2006.01)

(52) U.S. Cl. ............... 56/10.8; 180/19.3; 74/551.9; 200/293.1

(58) Field of Classification Search ............... 74/551.9, 74/471 XY, 483 PB, 483 K, 483 R, 473.31; 37/276; 180/333, 6.48, 286, 19.3; D8/303; 200/293.1, 61.85; 56/11.3, 11.8, 11.4, DIG. 18, 56/10.8
See application file for complete search history.

(56) References Cited

U.S. PATENT DOCUMENTS

| | | | | |
|---|---|---|---|---|
| 3,217,474 A | * | 11/1965 | Neilson | 56/12.7 |
| 3,800,902 A | * | 4/1974 | Keller | 180/167 |
| 4,140,200 A | | 2/1979 | Tucek | |
| 4,321,784 A | * | 3/1982 | Wood et al. | 56/17.2 |
| 4,663,923 A | * | 5/1987 | Boice | 56/15.8 |
| 5,146,735 A | * | 9/1992 | McDonner | 56/11.3 |
| 5,251,428 A | * | 10/1993 | Gay | 55/16.7 |
| 5,496,226 A | * | 3/1996 | Splittstoesser et al. | 476/24 |
| 5,771,670 A | * | 6/1998 | Perry | 56/12.1 |
| 5,915,487 A | * | 6/1999 | Splittstoesser et al. | 180/19.1 |
| 5,924,516 A | | 7/1999 | Sagaser et al. | |
| 6,021,630 A | * | 2/2000 | Higashi et al. | 56/11.3 |
| 6,056,668 A | * | 5/2000 | Nagashima | 477/207 |
| 6,176,016 B1 | * | 1/2001 | Higashi et al. | 30/276 |
| 6,301,864 B1 | * | 10/2001 | Damie et al. | 56/11.3 |
| 6,343,668 B1 | * | 2/2002 | Dean | 180/315 |
| 6,434,917 B1 | * | 8/2002 | Bartel | 56/11.3 |
| 6,530,200 B1 | * | 3/2003 | Minoura et al. | 56/17.1 |
| 6,557,331 B2 | | 5/2003 | Busboom et al. | |
| 6,578,656 B2 | * | 6/2003 | Samejima et al. | 180/291 |
| 6,640,444 B1 | * | 11/2003 | Harada et al. | 30/277.4 |
| 6,668,529 B2 | | 12/2003 | Busboom et al. | |
| 6,729,115 B2 | * | 5/2004 | Bartel | 56/11.3 |
| 6,739,116 B2 | * | 5/2004 | Stover et al. | 56/11.3 |
| 6,827,174 B2 | | 12/2004 | Chernoff et al. | |
| 6,951,092 B2 | | 10/2005 | Busboom et al. | |
| 6,966,168 B1 | * | 11/2005 | Kerr, Sr. | 56/12.7 |
| 2003/0000192 A1 | * | 1/2003 | Busboom et al. | 56/10.8 |
| 2006/0172857 A1 | * | 8/2006 | Eavenson et al. | 477/203 |
| 2006/0174601 A1 | | 8/2006 | Piontek | |
| 2007/0169743 A1 | * | 7/2007 | Kobayashi et al. | 123/352 |

* cited by examiner

*Primary Examiner*—Árpád Fábián-Kovács

(57) ABSTRACT

A dual lever steering control mechanism for a zero turning radius mower includes left and right steering levers that are independently pivotable fore and aft between reverse, neutral and forward positions. Steering lever grips are attached to and project from the steering levers. Each steering lever grip has a mounting surface with an electrical switch on the mounting surface, and a protective structure extending from the mounting surface.

16 Claims, 3 Drawing Sheets

ELECTRICAL SWITCHES MOUNTED IN STEERING LEVER GRIPS OF ZERO TURNING RADIUS MOWER

FIELD OF THE INVENTION

This invention relates to zero turning radius (ZTR) mowers having independently powered left and right drive wheels controlled by a pair of steering levers or sticks, and more specifically to electrical switches mounted in the steering lever grips.

BACKGROUND OF THE INVENTION

Grass mowing machines known as ZTR mowers have at least one independently powered drive wheel on each side of a frame. One drive wheel may be operated in a forward direction while the other drive wheel may be stopped or operated in reverse. Many ZTR mowers have a dual lever steering control mechanism. A pair of steering levers or sticks may be provided side-by-side, with each lever or stick controlling one of the drive wheels. When the dual levers or sticks are advanced together forwardly out of their neutral position, both drive wheels rotate forwardly to cause the mower to move forward. A ZTR mower may be steered by advancing one lever or stick more than the other.

Typically, each steering lever or stick on a ZTR mower may be linked to a pump arm of one of two separate hydraulic pumps, or of a dual hydraulic pump; i.e., a separate pump for each wheel. The lever or stick may be used to move a pump swash plate through a direct linkage.

The dual lever steering control mechanism may be mounted on the ZTR frame so that each lever or stick has a first pivot axis allowing the lever or stick in the operating position to pivot forwardly in an arc to turn the wheel in forward, or pivot rearwardly to turn the wheel in reverse. Additionally, each lever or stick may pivot outwardly in an arc from the operating position to a non-operating or parked position. Some dual levers or sticks may pivot outwardly to activate a safety switch which can deactivate the PTO and/or cutting blades, allowing the operator to exit or enter the operator seat or platform.

ZTR mowers are typically equipped several electrical switches that the operator may need to access during operation of the machine. These include electrical switches for the PTO, lights, mower deck lift, etc. However, an operator cannot actuate a switch unless he removes one hand from a steering lever or stick, attempts to steer with his other hand, slows down, and finds the appropriate switch with his or her free hand.

While actuating an electrical switch with his free hand, an operator may have difficulty steering the ZTR mower with his other hand. This is because the inwardly facing ends of the steering levers may be separated by more than about 1-2 inches during a turn. To hold both steering levers with one hand, he or she needs to bring their ends close together, so that their ends are separated by less than about 1 inch. Or the operator may need to stop the ZTR mower. Otherwise, it may be unsafe to actuate a switch while keeping only one hand on the dual lever steering controls. This results in lower efficiency of mowing operations.

There is a need for dual steering levers that allow an operator to actuate an electrical switch while keeping both hands on the steering levers. There is a need to actuate more than one switch at a time while operating a ZTR mower. There is a need to actuate one or more switches while the ZTR mower travels in a straight line, corners, or stops. There is a need for a dual lever steering control mechanism that enhances operator safety, and increases efficiency, during mowing operations.

SUMMARY OF THE INVENTION

Electrical switches are mounted in each steering lever grip of a dual lever steering control mechanism. The operator may actuate either or both switches while keeping his or her hands on the steering lever grips. One switch may disengage the PTO, and the other switch may raise the mower deck. The switches may be actuated while the operator steers the ZTR mower in a straight line, corners, or stops. The switches may be on mounting surfaces spaced from the end of each steering lever grip. Protective structures may extend from the mounting surfaces, and may shield and prevent inadvertent actuation of the switches. The switches enhance operator safety and increase efficiency of mowing operations.

DESCRIPTION OF THE PREFERRED EMBODIMENT

The present invention may be used on a ZTR mower 101 having at least one drive wheel 102, 104 on each side that is independently powered so that it may rotate independently of the other drive wheel. The pair of drive motors may be connected via hydraulic conduits to a dual hydrostatic pump; i.e., a separate pump for each wheel. Each side of the dual hydrostatic pump may have a swash plate that may define a pump stroke between a neutral position and a full forward position.

Figure 1:
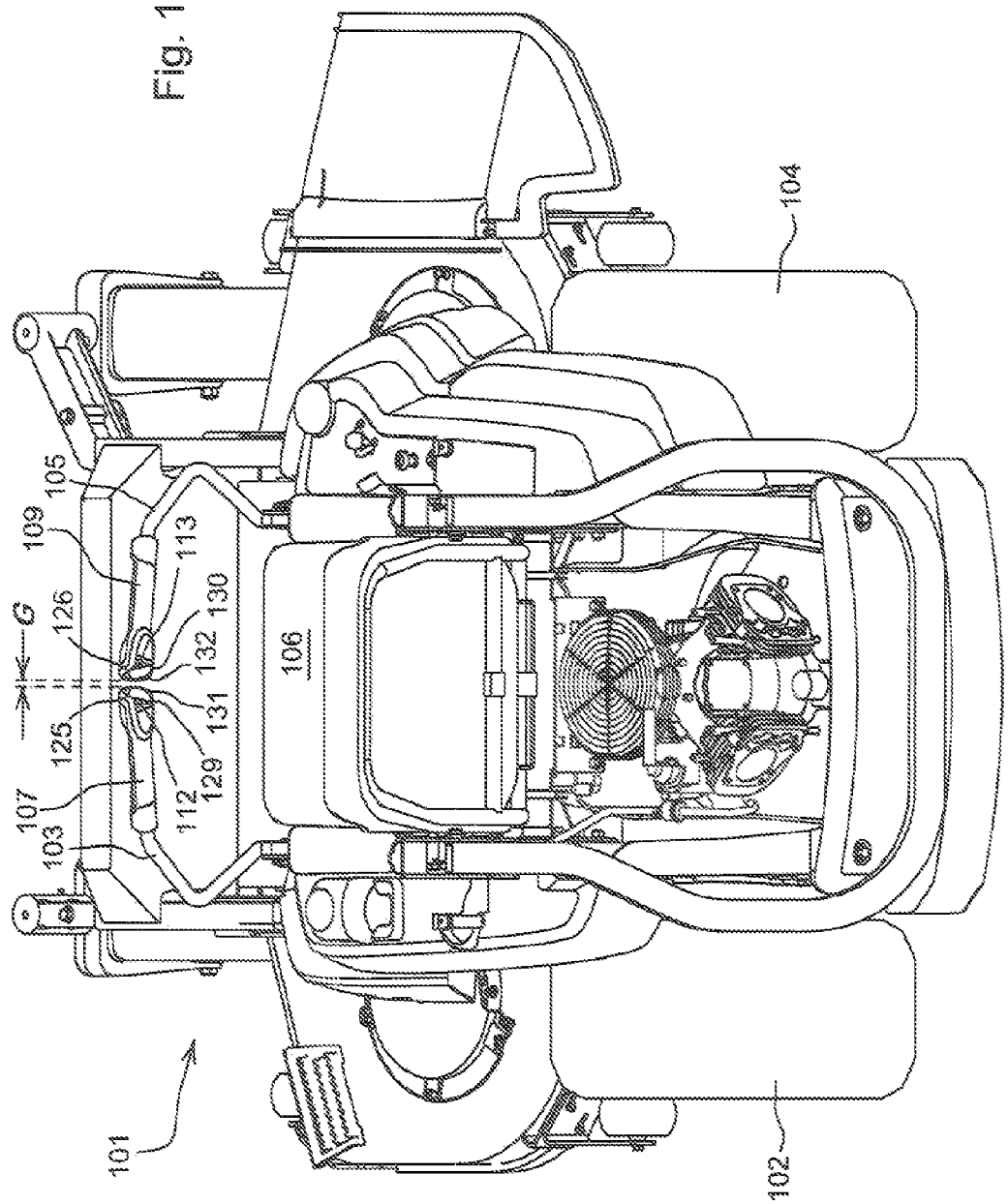
FIG. 1 is a top perspective view of a ZTR mower with electrical switches mounted in each steering lever grip of a dual lever steering control mechanism according to a first embodiment of the invention.

In a first embodiment shown in FIG. 1, left and right steering levers or sticks 103, 105 may be used to operate ZTR mower 101. Each steering lever may be mounted to the mower so that the lever may pivot forwardly to move a swash plate in a hydrostatic pump in a first direction to cause a drive wheel to rotate forward, or pivot rearwardly to move the swash plate in a second direction to cause the drive wheel to rotate backward. Each steering lever may have a neutral position in which the corresponding drive wheel is at rest. The pair of steering levers may be mounted in front of an operator's seat 106 or platform on a ZTR mower. The lower ends of each steering lever 103, 105 may be mounted to a pivoting mechanism on the frame of the ZTR mower, so that each lever can independently pivot fore and aft, and also pivot outwardly to a park position. A steering lever grip 107, 109 is attached to the upper end of each steering lever. If both steering levers are pivoted to a neutral position as shown in FIG. 1, or to the same forward or reverse positions, the separation or gap (G) between the ends 125, 126 of steering lever grips 107, 109 is small enough so that an operator can hold both grips with one hand, typically less than about 1 inch.

In one embodiment, each steering lever grip 107, 109 includes an electrical switch 112, 113 on a mounting surface 129, 130 spaced from ends 125, 126 of the steering lever grip. An operator can actuate one or both switches simultaneously while keeping both hands on the steering lever grips. The switches may be used for various functions, and preferably one switch shuts off the PTO that turns one or more cutting blades, and the other switch raises the mower deck enclosing the blades.

Figure 2:
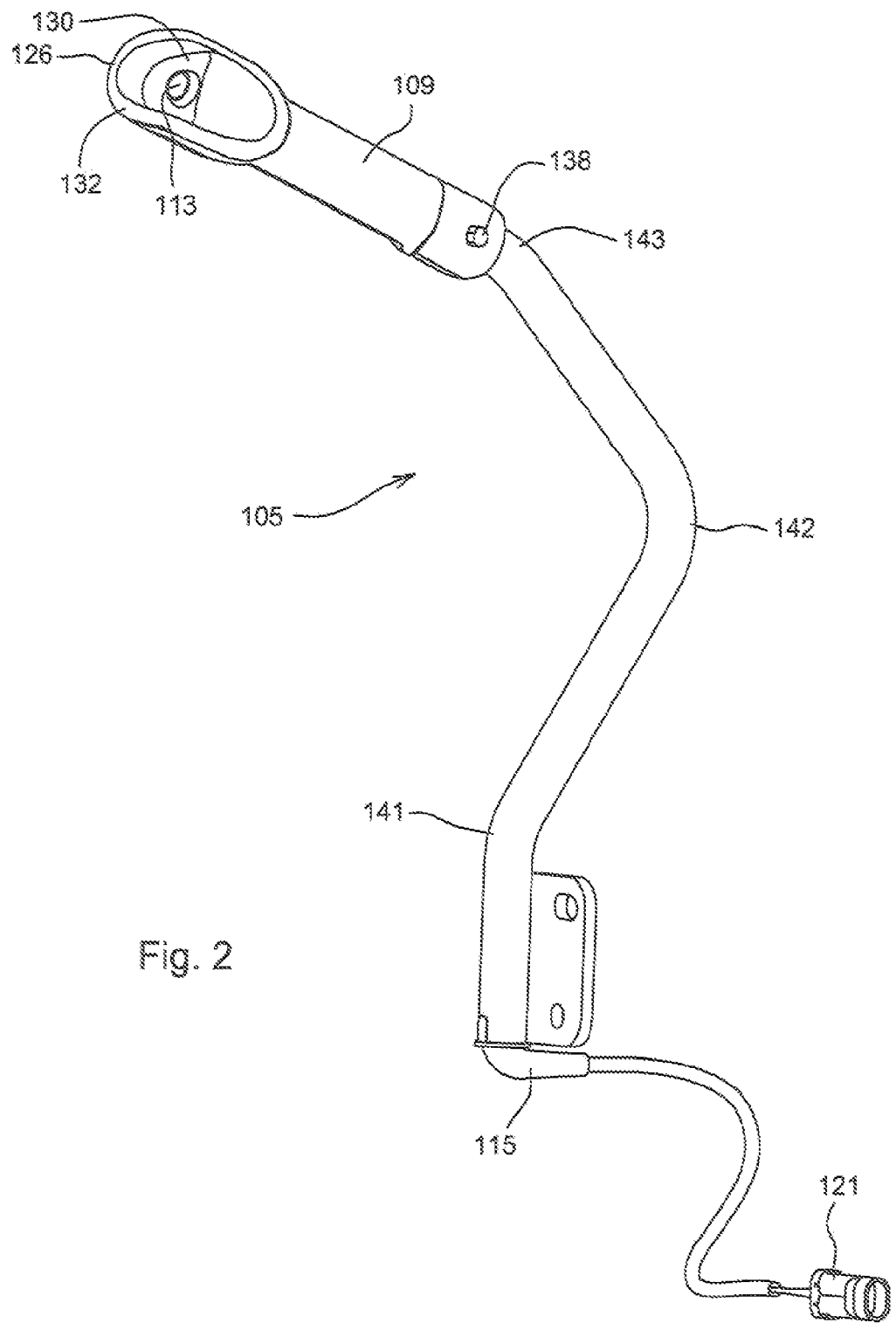
FIG. 2 is a perspective view of a steering lever for a ZTR mower with an electrical switch mounted in the steering lever grip according to a first embodiment.
Figure 3:
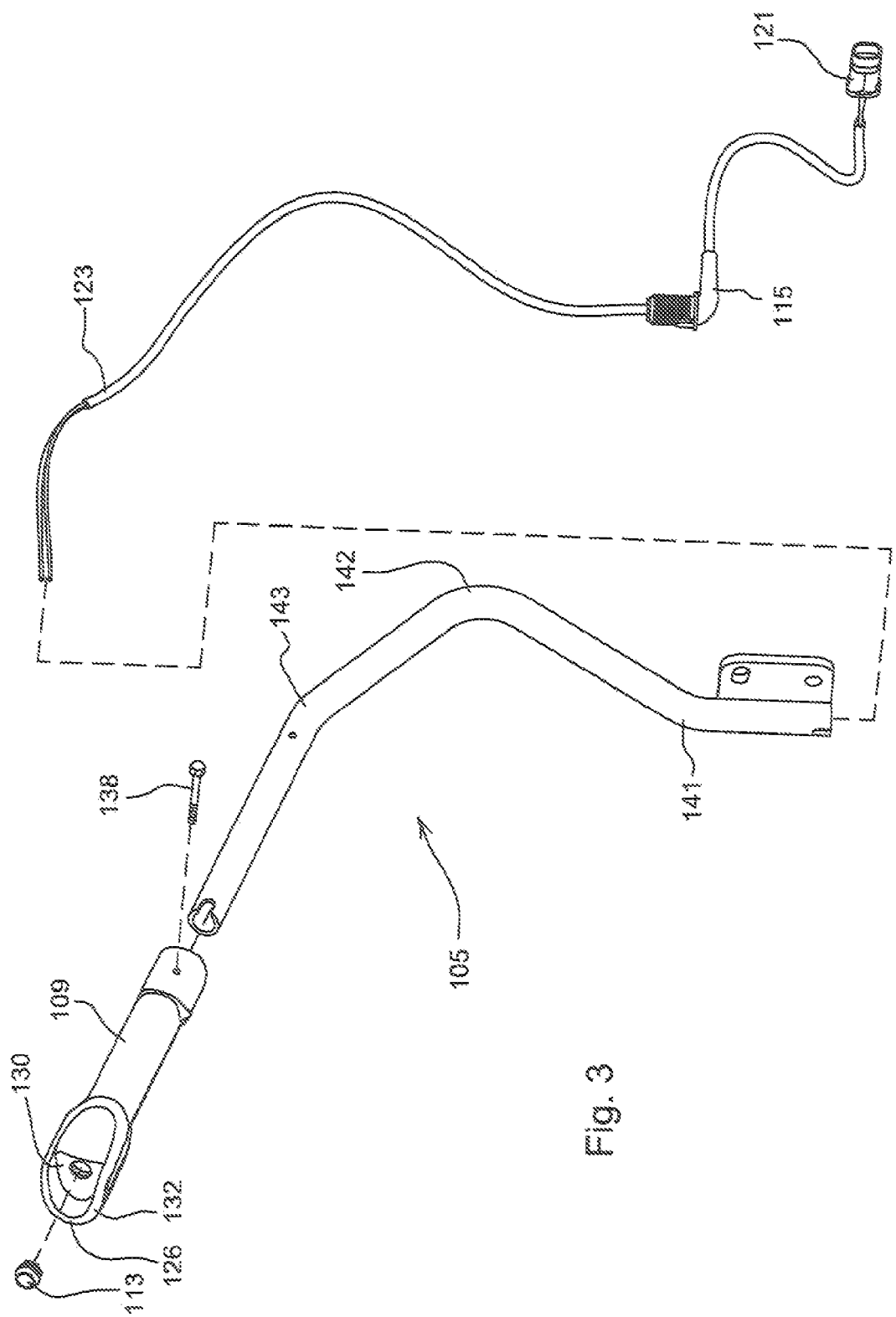
FIG. 3 is an exploded view of a steering lever for a ZTR mower with an electrical switch mounted in the steering lever grip according to a first embodiment.

FIGS. 2-3 show an embodiment of right steering lever 105 with electrical switch 113 mounted in steering lever grip 109. Left steering lever 103 is an identical mirror image of right steering lever 105, and the components described are the same. Steering lever 105 may be a tubular member having three bends 141, 142, 143 of less than about 90 degrees each. Steering lever grip 109 may be attached to the upper end of the tubular member and may be secured with threaded fastener 138. Part of the steering lever grip may slide over the upper end of the tubular member, so that end 126 of grip 109 projects from the end of the tubular member. The steering lever grip may be a plastic or rubber sleeve having a generally cylindrical outer surface with an outer diameter between about ¾ inches and about 1½ inches. At least part of the steering lever grip may have an outer surface dimensioned to ergonomically conform to the hand of an operator.

In one embodiment, switches 112, 113 may be mounted on mounting surface 129, 130 of steering lever grip 107, 109. Mounting surfaces 129, 130 may be shoulder surfaces spaced from ends 125, 126 of the steering lever grips, and preferably between about ½ inch and about 2 inches from the ends of the steering lever grips. The switches may be push button or rocker switches that snap into the mounting surfaces of the grip. The switches may be mounted using a snap lock for retainment to allow future replacement or service.

In one embodiment, switch 113 may be attached to jumper harness 121 inserted into the bottom end of the steering lever tube and routed to the top end of the tube. Once the jumper harness is installed, end wires 123 may be inserted into the steering lever grip. After then end wires are inserted to the end of the steering lever grip, a connection to the switch can be made. Wire strain relief grommet or bushing 115 may be provided at the lower end of the steering lever to minimize the amount of bending in the wire strands. After the sub-assembled steering lever is attached to the traction unit, the jumper harness may be connected to a main harness to complete the circuit.

In one embodiment, the ends 125, 126 of each steering lever grip may include a guard area or protective structure 131, 132. The protective structures may project from mounting surfaces 129, 130 to the ends of the steering lever grips. The protective structures may be wall members that are integral with the steering lever grips and extend at least partially around the mounting surfaces of the steering lever grips. For example, the wall members may extend between about 150 degrees and about 210 degrees around the mounting surfaces of the steering lever grips, and have a length of between about ½ inch and about 2 inches.

In one embodiment, the operator may place his or her thumbs on each switch while holding the steering lever grips in his or her hands. The protective structures prevent inadvertent actuation of the switches, and allow an operator to actuate one or both switches using his or her thumbs, even if the ends of the grips are separated by less than about 1 inch. For example, a ZTR mower operator may actuate one or both switches while holding the steering lever grips at the neutral position shown in FIG. 1. The operator also may actuate one or both switches while holding the steering lever grips in a sharp turn, so that the ends of the grips are separated from each other by substantially more than 1 inch.

Having described the preferred embodiment, it will become apparent that various modifications can be made without departing from the scope of the invention as defined in the accompanying claims.

The invention claimed is:

1. A dual lever steering control mechanism for a zero turning radius mower having a mower deck covering a plurality of mower blades rotated by a PTO, comprising:
   a pair of steering levers pivotably mounted to the zero turning radius mower and having upper and lower ends;
   a steering lever grip attached to the upper end of each steering lever, each steering lever grip having an end with a protective structure and a mounting surface spaced from the end; and
   an electrical switch on each mounting surface.

2. The dual lever steering control mechanism of claim 1 wherein the mounting surface is between about ½ and about 2 inches from the end of the steering lever grip.

3. The dual lever steering control mechanism of claim 1 wherein the protective structure is a wall member that is integral with the steering lever grip and extends at least partially around the mounting surface of the steering lever grip.

4. The dual lever steering control mechanism of claim 1 wherein one of the electrical switches shuts off the PTO.

5. The dual lever steering control mechanism of claim 1 wherein one of the electrical switches raises the mower deck.

6. The dual lever steering control mechanism of claim 1 wherein each electrical switch is connected to wires inserted through the steering lever.

7. The dual lever steering control mechanism of claim 1 wherein each electrical switch is a push button switch.

8. A dual lever steering control mechanism for a zero turning radius mower having a mower deck covering a plurality of mower blades rotated by a PTO, comprising:
   a pair of pivotable steering levers having upper ends with steering lever grips attached thereto such that the steering lever grips are spaced less than one inch from each other if both steering levers are in a neutral position;
   each steering lever grip having an end, a mounting surface spaced from the end, and an electrical switch positioned on the mounting surface;
   wherein each mounting surface is between about ½ inch and about 2 inches from the end of the steering lever grip.

9. A dual lever steering control mechanism for a zero turning radius mower having a mower deck covering a plurality of mower blades rotated by a PTO, comprising:
   a pair of pivotable steering levers having upper ends with steering lever grips attached thereto such that the steering lever grips are spaced less than one inch from each other if both steering levers are in a neutral position;
   each steering lever grip having an end, a mounting surface spaced from the end, and an electrical switch positioned on the mounting surface;
   wherein one of the electrical switches shuts off the PTO and the other switch raises the mower deck.

10. A dual lever steering control mechanism for a zero turning radius mower having a mower deck covering a plurality of mower blades rotated by a PTO, comprising:
    a pair of pivotable steering levers having upper ends with steering lever grips attached thereto such that the steering lever grips are spaced less than one inch from each other if both steering levers are in a neutral position;
    each steering lever grip having an end, a mounting surface spaced from the end, and an electrical switch positioned on the mounting surface;

wherein each protective structure is a wall member integral with the steering lever grip.

11. A dual lever steering control mechanism for a zero turning radius mower having a mower deck covering a plurality of mower blades rotated by a PTO, comprising:
   left and right steering levers that are independently pivotable fore and aft between reverse, neutral and forward positions;
   steering lever grips attached to and projecting from the steering levers, each steering lever grip having an end and an mounting surface spaced from the end;
   electrical switches on the mounting surfaces; and
   protective structures extending from the mounting surfaces.

12. The dual lever steering control mechanism of claim 11 wherein each of the protective structure is a wall member that is integral with the steering lever grip and extends at least partially around the mounting surface of the steering lever grip.

13. The dual lever steering control mechanism of claim 11 wherein one of the electrical switches deactivates the PTO.

14. The dual lever steering control mechanism of claim 11 wherein one of the electrical switches raises the mower deck.

15. The dual lever steering control mechanism of claim 11 further comprising a strain relief grommet at the lower end of each steering lever.

16. The dual lever steering control mechanism of claim 11 wherein the ends of the steering lever grips are separated from each other by less than one inch if both steering levers are in the same position.

* * * * *